(12) United States Patent
Haack

(10) Patent No.: US 6,285,747 B1
(45) Date of Patent: Sep. 4, 2001

(54) TELECOMMUNICATIONS APPARATUS AND METHOD

(75) Inventor: Reiner Haack, Ruemmelsheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/314,355

(22) Filed: May 19, 1999

(30) Foreign Application Priority Data

Jun. 19, 1998 (DE) .............................................. 198 27 376

(51) Int. Cl.$^7$ .................................................. H04M 11/00
(52) U.S. Cl. .................................... 379/102.02; 379/93.14
(58) Field of Search ......................... 379/102.02, 102.01, 379/93.14, 93.09, 93.01

(56) References Cited

U.S. PATENT DOCUMENTS

| | | | |
|---|---|---|---|
| 5,764,757 | * | 6/1998 | Christinger ....................... 379/102.02 |
| 5,809,127 | * | 6/1998 | Ostrcil ............................... 379/102.02 |

FOREIGN PATENT DOCUMENTS 195 42 122 A1   5/1996 (DE) .

OTHER PUBLICATIONS

Schneegans, M.:CTI Goes Web, In Net, vol. 5, 1998, pp. 30–32.

* cited by examiner

*Primary Examiner*—Stella Woo
(74) *Attorney, Agent, or Firm*—Michael J. Striker

(57) ABSTRACT

The telecommunications apparatus has telephone terminal devices (3) that are constructed to be operable fully and completely by a connected computer via a telephone exchange unit. The computer (2) generates operating signals for full and complete operation of the telephone terminal devices (3), which are connected with the computer only through the telephone exchange unit. The computer (2) is connected with the telephone exchange unit (1) by means of a standard data link and the telephone exchange unit (1) is equipped so that the operating signals from the computer are converted for transmission in a telephone channel (B channel) connecting the telephone terminal devices (3) to the telephone exchange unit.

5 Claims, 1 Drawing Sheet

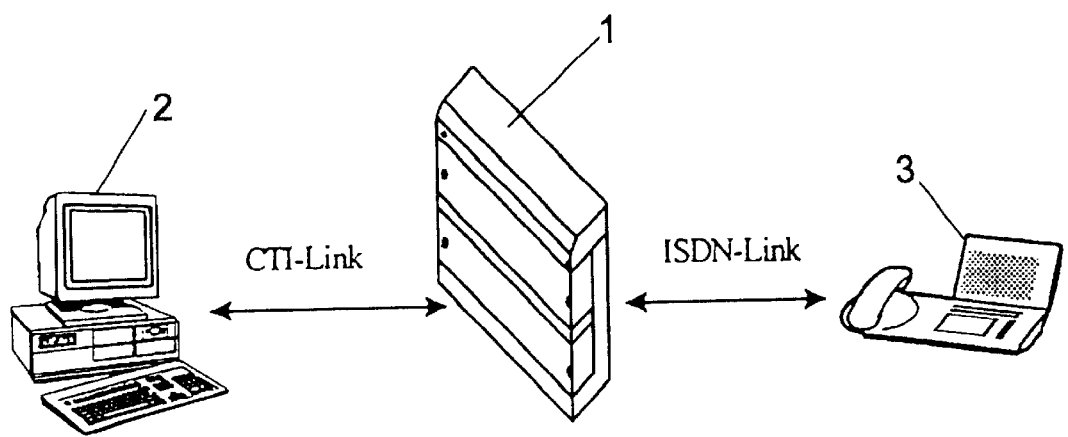

TELECOMMUNICATIONS APPARATUS AND METHOD

BACKGROUND OF THE INVENTION

The present invention relates to a telecommunications apparatus with a plurality of telephone terminal devices and a telephone exchange unit for control of the telephone communications between the telephone terminal devices and between the telephone terminal devices and a fixed telecommunications fixed network, in which the telephone terminal devices are operable by a connected computer. It also relates to a method of telecommunications between the telephone terminal devices and between the fixed telecommunications network and the telephone terminal devices.

Telecommunications systems, which have their own central exchange unit, to which a plurality of telephone terminal devices are connected, are increasingly connected in fixed telecommunications networks. The telephone exchange unit controls the connection of incoming calls with the desired telephone terminal devices and the connection of the telephone terminal devices with each other. The telephone terminal devices communicate with the telephone exchange unit by means of a telephone channel. There is a frequently occurring requirement that the telephone terminal device should not be operated separately, especially when data is input to a computer and, if necessary, output from the computer during a telephone contact, for example as is the case with telephonic information services or telephonic customer contacts.

In this situation it is appropriate to perform certain operations of the telephone terminal device themselves by means of the computer, for example the relaying of an incoming call, the making of a conference connection, the turning on of a speaker device. For this purpose it is known to provide the telephone terminal device with a computer interface, in order to be able to transmit operating signals that are analyzed by the microprocessor of the telephone terminal device to the telephone terminal device by means of the computer.

Conventionally besides the telephone terminal devices computers also are connected to the telephone exchange unit. For this purpose a suitable bus, which is called a CTI link (CTI=computer telephone interface), exists. A communication between the computer and the telephone exchange unit occurs in a data channel thus formed, for example in order to perform a fax operation from the computer and to immediately undertake an information exchange by means of data via the telephone exchange unit. Basically it is conceivable, to permit performance of control functions directly by the telephone exchange unit by means of the computer which is connected via the data channel with the telephone exchange unit, which would otherwise be performed by manual operation of the telephone terminal device. This has the disadvantage that the microprocessor of the concerned telephone terminal device being controlled receives no information regarding the change of the configuration of the telephone exchange unit because of the control signals from the computer, so that the changed configuration is detected in the connected telephone terminal device as interference and can lead to an interruption of the connection.

The remote operation of a telephone terminal device by means of a computer can thus take place in the known telecommunications arrangements only when the computer is directly connected to the telephone terminal device. This known arrangement has the disadvantage that a special connection must be made and that the telephone terminal unit is only operated in an imperfect manner during remote control operation. For example, an operating signal can only be provided in a display of a telephone terminal device in manual operation, but in the remote control operation by means of a computer.

SUMMARY OF THE INVENTION

It is an object of the present invention to provide as complete a remote control operation of a telephone terminal device as during manual operation of that telephone terminal device in as simple a manner as possible by means of a remotely connected computer.

It is also an object of the invention to provide an improved method of telecommunications between telephone terminal devices themselves and between a computer associated with a fixed telecommunications network and the telephone terminal devices, whereby the telephone terminal devices are fully controllable by the computer without additional connection efforts and expenses.

This object is attained according to the invention in a telephone communications apparatus of the above-described kind in which the computer generating the operating signals for the telephone terminal device is connected with the telephone exchange unit by means of a data link, the telephone exchange unit is equipped so that it converts the operating signals input to a data channel of the data link for transmission into a telephone channel leading to the telephone terminal device and the telephone terminal devices are designed so that they are controllable by the operating signals transmitted over the telephone channel.

According to the present invention the conventional bus present in conventional telephone communication apparatus for connection of computers to the telephone exchange unit (CTI link) is used in order to also transmit the operating signals to the telephone exchange unit (on the B channel). The telephone exchange unit only converts or translates the received operating signals for transmission on the telephone channel (B channel) and transmits the converted operating signals unchanged to the telephone terminal device. Thus the telephone terminal devices receive their operating signals by means of the telephone channel, so that display-capable telephone terminal devices also have a continuously correct display signal during control by computer. The invention provides the additional advantage that during remote control operation by the computer the telephone terminal unit is in a state which corresponds to that during manual operation, so that during an exchange process a mixed operation between remote control and manual operation can take place.

In the telephone exchange unit only transmission of the operating signals to the telephone terminal device occurs. The exchange-controlled information transmission between the telephone terminal devices and the telephone exchange unit is the same as that in manual operation. The otherwise required additional hardware, for example in the form of connecting cables, is eliminated by the use of the CTI link and the operation by the telephone terminal device itself based on the operating signals received by the telephone terminal device from the telephone exchange unit.

BRIEF DESCRIPTION OF THE DRAWING

The objects, features and advantages of the invention will now be illustrated in more detail with the aid of the following description of the preferred embodiments, with reference to the accompanying sole FIGURE that is a diagrammatic perspective view of a telecommunications apparatus according to the present invention.

DESCRIPTION OF THE PREFERRED EMBODIMENT

The drawing shows a telephone exchange unit 1, which is connected in a known way by a CTI link with a computer 2, usually in the form of a personal computer. The CTI link provides a data connection by means of which data are transmitted, which are processed in the telephone exchange unit in the B-channel.

The telephone exchange unit 1 is connected with telephone terminal devices 3, of which only one is shown in the drawing. The connection occurs by means of a telephone channel (Channel B), which exists in an ISDN link in an ISDN system.

According to the invention operating signals are first transmitted from the computer 2 to the telephone exchange unit 1. The telephone exchange unit 1 transmits the operating signals by means of an internal ISDN interface and the ISDN link to the concerned telephone terminal device after a suitable conversion. After analyzing the operating signals the telephone terminal device 3 initiates the communications actions associated with the operating signal via the telephone exchange unit 1.

The actions of the telephone terminal device 3 initiated by remote control correspond largely to the actions performed in manual operation of the telephone terminal device. Especially the display control of the telephone terminal device and the signal traffic or communication between the telephone terminal device 3 and the telephone exchange unit 1 are identical for manual operation and remote control performed according to the invention.

The disclosure in German Patent Application 198 27 376.2 of Jun. 19, 1998 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in a telecommunications apparatus, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

I claim:

1. A telecommunications apparatus comprising a plurality of telephone terminal devices (3), a telephone exchange unit (1) for control of the telecommunications of the telephone terminal devices (3) with each other and between the telephone terminal devices (3) and a fixed telecommunications network with a computer (2), wherein the telephone terminal devices (3) are constructed for operation by said computer and are connected with the computer only through the telephone exchange unit (1), said computer (2) generates operating signals for full and complete control and operation of said telephone terminal devices (3), said computer (2) is connected with said telephone exchange unit (1) by means of a data link having a data channel for transmission of said operating signals, said telephone exchange unit (1) is equipped so that said operating signals input to said data channel by said computer are converted or translated for transmission in a telephone channel connecting the telephone exchange unit (1) with the telephone terminal devices (3) and the telephone terminal devices (3) are constructed to be operable by said operating signals transmitted over said telephone channel;

whereby said telephone terminal devices are manually operable or operable by remote control according to said operating signals from said computer when said telephone terminal devices receive said operating signals from said computer.

2. The telephone communications apparatus as defined in claim 1, wherein said data link is a CTI link and said telephone channel is a B channel.

3. A method of mixed manual and remote operation of a plurality of telephone terminal devices by means of a computer remotely connected with said telephone terminal devices via a telephone exchange unit (1) during telecommunications between said telephone terminal devices and said computer by means of a fixed telecommunications network, said method comprising the steps of:

a) providing the telephone exchange unit (1) for controlling telecommunications of the telephone terminal devices (3) with each other and between the remotely connected computer (2) and at least one of the telephone terminal devices and providing means for operating said telephone terminal devices (3) by means of said computer in the telephone terminal devices;

b) generating operating signals for the telephone terminal devices (3) in said computer (2);

c) transmitting said operating signals from said computer to said telephone exchange unit (1) by means of a data channel for the operating signals;

d) converting or translating said operating signals for transmission to said telephone terminal devices (3) in said telephone exchange unit (1); and e) after the converting or translating, transmitting said operating signals that are converted or translated in step d) to said telephone terminal devices (3) over a standard telephone channel for telecommunications;

whereby said telephone terminal devices (3) are fully operable by said operating signals from said computer (2).

4. The method as defined in claim 3, wherein said data link is a CTI link and said telephone channel is a B channel.

5. A telecommunications apparatus comprising a plurality of telephone terminal devices (3);

a fixed telecommunications network including a computer (2), said computer including means for generating operating signals for full and complete operation of each of said telephone terminal devices (3); and a telephone exchange unit (1) for control of telecommunications of the telephone terminal devices (3) with each other and between the telephone terminal devices (3) and the computer (2), wherein the telephone terminal devices (3) are connected with the computer (2) only through the telephone exchange unit (1) and said computer (2) is connected with said telephone exchange unit (1) by means of a CTI data link having a data channel for transmission of said operating signals to the telephone exchange unit (1) and said telephone exchange unit (1) is connected to the telephone terminal devices (3) by means of a telephone B channel;

wherein said telephone exchange unit (1) comprises means for converting or translating said operating signals input to said data channel by said computer for transmission in said telephone B channel connecting the telephone exchange unit (1) with the telephone terminal devices (3) and the telephone terminal devices (3) are constructed to be fully and completely operable by said operating signals that are converted or translated in the telephone exchange unit (1) and transmitted over said telephone B channel;

whereby said telephone terminal devices (3) are manually operable or operable by remote control according to said operating signals from said computer when said telephone terminal devices receive said operating signals from said computer.

* * * * *